(12) United States Patent
Kim

(10) Patent No.: US 12,366,278 B2
(45) Date of Patent: Jul. 22, 2025

(54) FLUID MOUNT DEVICE FOR VEHICLE

(71) Applicants: HYUNDAI MOTOR COMPANY, Seoul (KR); Kia Corporation, Seoul (KR)

(72) Inventor: Seung Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 410 days.

(21) Appl. No.: 17/867,046

(22) Filed: Jul. 18, 2022

(65) Prior Publication Data
US 2023/0055754 A1 Feb. 23, 2023

(30) Foreign Application Priority Data
Aug. 18, 2021 (KR) .................. 10-2021-0108450

(51) Int. Cl.
*F16F 9/32* (2006.01)
(52) U.S. Cl.
CPC .................. *F16F 9/3207* (2013.01)
(58) Field of Classification Search
CPC ..................................................... F16F 13/16
USPC ..................................................... 267/141.2
See application file for complete search history.

(56) References Cited

U.S. PATENT DOCUMENTS

| 6,705,600 B2 * | 3/2004 | Yamaguchi | F16F 13/16 267/140.11 |
| 2019/0078639 A1 * | 3/2019 | Hattori | B60K 5/1291 |

FOREIGN PATENT DOCUMENTS

| CN | 104781576 A | * | 7/2015 | ............. F16F 13/16 |
| JP | H0632786 U | * | 4/1994 | |

OTHER PUBLICATIONS

CN-104781576-A—English Machine Translation (Year: 2015).*
JP-H0632786U—English Machine Translation (Year: 1994).*

* cited by examiner

*Primary Examiner* — Melanie Torres Williams
(74) *Attorney, Agent, or Firm* — Morgan Lewis & Bockius LLP

(57) ABSTRACT

A fluid mount for a vehicle includes a main bush mounted on an outer circumferential surface of an inner pipe and to which an outer pipe is coupled so that a fluid-contained internal region is sealed, and a middle bush dividing the internal region into a front liquid chamber and a rear liquid chamber and configured to, when vibration is generated along an axial direction of the inner pipe, form a fluid path extending a vibration-generating direction to allow the fluid to selectively flow from the front liquid chamber to the rear liquid chamber or from the rear liquid chamber to the front liquid chamber in the internal region.

6 Claims, 9 Drawing Sheets

FLUID MOUNT DEVICE FOR VEHICLE

CROSS-REFERENCE TO RELATED APPLICATION

This application claims under 35 U.S.C. § 119(a) the benefit of priority to Korean Patent Application No. 10-2021-0108450 filed on Aug. 18, 2021, the entire contents of which are incorporated herein by reference.

TECHNICAL FIELD

The present disclosure relates to a fluid mount device for a vehicle and, more particularly, to a fluid mount device for a vehicle capable of damping the residual vibration according to the axial behavior of the mount device generated by sudden acceleration, uneven roads, and the like.

BACKGROUND

In general, vehicles equipped with gasoline and diesel engines using fossil fuels have many problems, such as environmental pollution caused by an exhaust gas, global warming caused by carbon dioxide, and respiratory diseases caused by ozone generation or the like.

In addition, since fossil fuels existing on Earth are limited, they are in danger of being exhausted someday.

In order to solve this problem, electric vehicles, such as a pure electric vehicle (EV) that runs by driving a driving motor, a hybrid electric vehicle (HEV) that runs with an engine and a driving motor, a fuel cell electric vehicle (FCEV) that runs by driving a driving motor using electric power generated from a fuel cell, or the like, have been developed.

In general, the engine of a vehicle not only generates vibrations structurally, but also generates vibrations in all directions due to a complex action of various factors depending on the road unevenness or the like during driving.

In particular, a vehicle using a gasoline engine generates rotational torque of a crankshaft while a piston operates in the order of intake, compression, explosion, and exhaust through a four-stroke cycle, and significant vibrations are generated in this process.

In order to insulate such vibrations, an engine mount that supports an engine of a vehicle has been continuously developed. In particular, various studies are being conducted for the main purpose of securing insulation against vibration force generated by gasoline engines.

However, since an electric vehicle using a driving motor does not have a piston's reciprocating motion such as an explosion stroke as in a gasoline engine vehicle, the role of a motor mount should be changed to insulate shock vibration, jerk vibration, driving vibration, gear fine noise, etc., differently from that of the engine mount of the gasoline engine vehicle.

In particular, as the electric vehicle is equipped with a substantially 150 kg rigid motor module on both the front and rear wheels, unlike the gasoline engine vehicle showing up-down driving movement only on the front side, the electric vehicle shows driving movement on both the front and rear sides. Accordingly, vibrated shaking action may occur during vehicle driving, so it is important to improve this problem.

The above information disclosed in this background section is only for enhancement of understanding of the background of the present disclosure and therefore it may contain information that does not form the prior art that is already known in this country to a person of ordinary skill in the art.

SUMMARY OF THE DISCLOSURE

The present disclosure is proposed for solving the above problems, and provides a fluid mount device for a vehicle, the device having a fluid-contained bush-type mount structure, in which a middle bridge is disposed between an inner pipe and an outer pipe to partition the interior into a front liquid chamber and a rear liquid chamber such that the middle bridge is fixed separately from front and rear main bridges so that during forward moving along an axial direction, the front liquid chamber increases and the rear liquid chamber decreases in volume so that the internal fluid contained in the rear liquid chamber forcedly flows and is pumped toward the front liquid chamber, thereby securing damping characteristics in the axial direction, and accordingly, reducing the vibrated shaking action according to the axial behavior of the mount device generated by sudden acceleration, uneven roads, and the like.

The objectives of the present disclosure are not limited to those as described above, and other unmentioned objectives of the present disclosure can be clearly understood from the following description by those of ordinary skill in the art to which the present disclosure pertains (hereinafter, "ordinary technicians").

In one aspect of the present disclosure, a fluid mount for a vehicle includes: a main bush mounted on an outer circumferential surface of an inner pipe and to which an outer pipe is coupled so that an internal region of the main bush containing a fluid is sealed; and a middle bush dividing the internal region into a front liquid chamber and a rear liquid chamber and configured to, when vibration is generated along an axial direction of the inner pipe, form a fluid path along a vibration-generating direction to allow the fluid to selectively flow from the front liquid chamber to the rear liquid chamber or from the rear liquid chamber to the front liquid chamber in the internal region.

Here, the main bush may include a pair of main bridge rings disposed around the outer circumferential surface of the inner pipe, and a pair of main bridge ring covers, covering the pair of main bridge rings, each mounted at either end of the inner pipe to surround the outer circumference of the inner pipe, thus defining the internal region there between. The internal region may be disposed between the pair of main bridge ring covers.

The main bridge ring cover may include an elastic material so that one side and the other side thereof are deformed as the main bridge ring cover moves in the vibration-generating direction.

In addition, the middle bush may include a pair of middle bridge rings each having a semicircular shape and disposed to face each other in the internal region, first and second middle bridge ring covers fixedly mounted to surround an outer circumferential surface of the main bush to accommodate the middle bridge rings, a first middle plate having a hemispherical shape and coupled to the first middle bridge ring cover, and a second middle plate having a hemispherical shape and coupled to the second middle bridge ring cover and mounted to face the first middle plate to divide the internal region into the front liquid chamber and the rear liquid chamber.

Here, the first middle plate and the second middle plate may respectively include fluid guides forming the fluid paths, wherein the fluid guides are connected together to allow the fluid in the rear liquid chamber to selectively flow to the front liquid chamber via the first and second middle plates as vibration is generated toward the front side of the inner pipe.

In addition, as the fluid contained in the rear liquid chamber flows into the front liquid chamber through the fluid guides, an internal space of the front liquid chamber may relatively increase compared to that of the rear liquid chamber.

In addition, the first and second middle bridge ring covers may respectively have ribs protruding toward the outer circumferential surface of the main bush, and the ribs may be fixedly pressed against the outer circumferential surface of the main bush and provided with a plurality of micro holes formed to allow a portion of the fluid in the rear liquid chamber to selectively flow to the front liquid chamber.

The fluid mount device for a vehicle according to the present disclosure has the fluid-contained bush-type mount structure, in which the middle bridge is disposed between the inner pipe and the outer pipe to partition the interior into the front liquid chamber and the rear liquid chamber such that the middle bridge is fixed separately from front and rear main bridges so that during forward moving along an axial direction, the front liquid chamber increases and the rear liquid chamber decreases in volume so that the internal fluid contained in the rear liquid chamber forcedly flows and is pumped toward the front liquid chamber, thereby securing damping characteristics in the axial direction.

Accordingly, the bush-type mount structure has the effect of reducing the vibrated shaking action according to the axial behavior of the mount device generated by sudden acceleration, uneven roads, and the like.

Further, according to the present invention, when moving forward in the axial direction corresponding to a relatively small displacement, the fluid is bypassed through a plurality of micro-channels formed on the inner circumferential surface of the middle bridge facing the inner pipe to flow from the rear liquid chamber to the front liquid chamber, thereby having the effect of being able to improve the dynamic characteristic of a radio frequency.

BRIEF DESCRIPTION OF THE DRAWINGS

The above and other features of the present disclosure will now be described in detail with reference to certain exemplary embodiments thereof illustrated the accompanying drawings which are given hereinafter by way of illustration only, and thus are not limitative of the present disclosure, and wherein.

Figure 1:
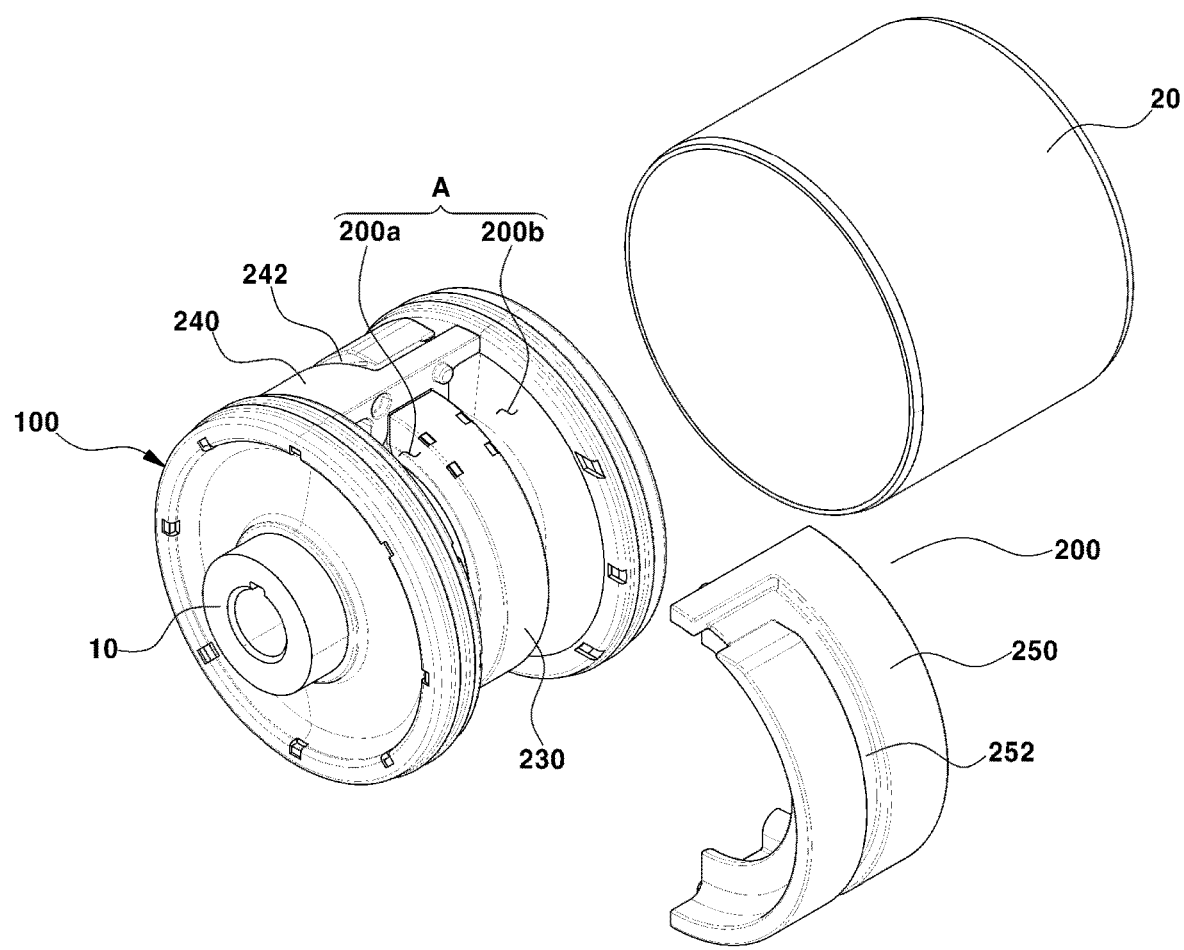
FIG. 1 is a view illustrating a disassembled state of a fluid mount device for a vehicle according to an embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, preferred embodiments of the present disclosure will be described in detail with reference to the accompanying drawings.

The aspects and features of the disclosure and methods for achieving the aspects and features will be apparent by referring to the embodiments to be described in detail with reference to the accompanying drawings.

However, the present disclosure is not limited to the embodiments disclosed hereinafter, and it can be implemented in diverse forms. The present embodiments are provided to assist those of ordinary skill in the art in a comprehensive understanding of the disclosure, and the present disclosure is only defined within the scope of the appended claims.

Further, in describing the present disclosure, a detailed description of a related known technology will be omitted if it is deemed to make the gist of the present disclosure unnecessarily vague.

Figure 2:
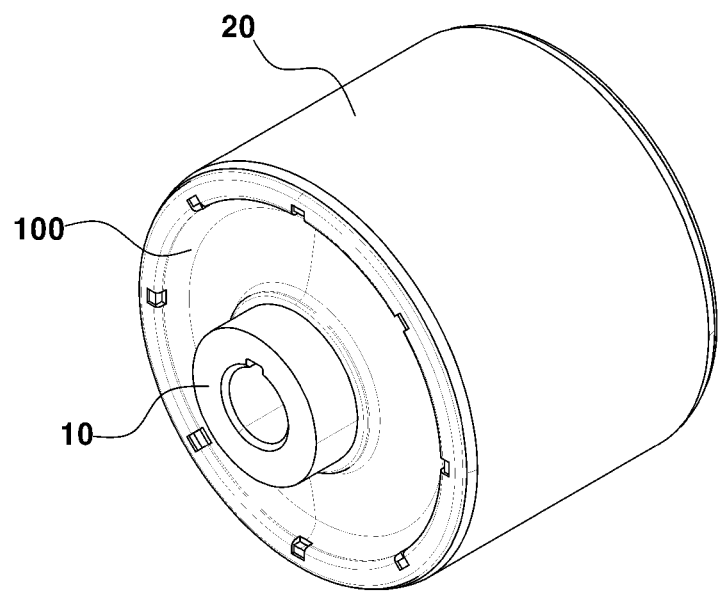
FIG. 2 is a view illustrating an assembled state of a fluid mount device for a vehicle according to an embodiment of the present disclosure.
Figure 3A:
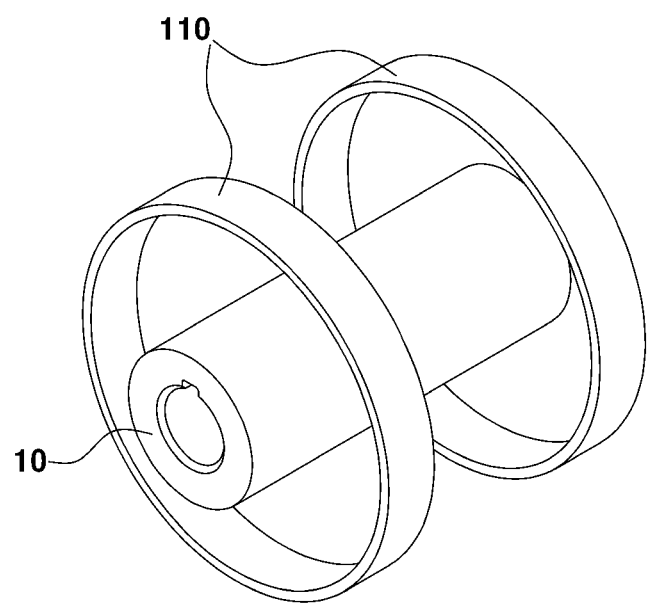
FIGS. 3A and 3B are views illustrating a main bush for a fluid mount device for a vehicle according to an embodiment of the present disclosure.
Figure 3B:
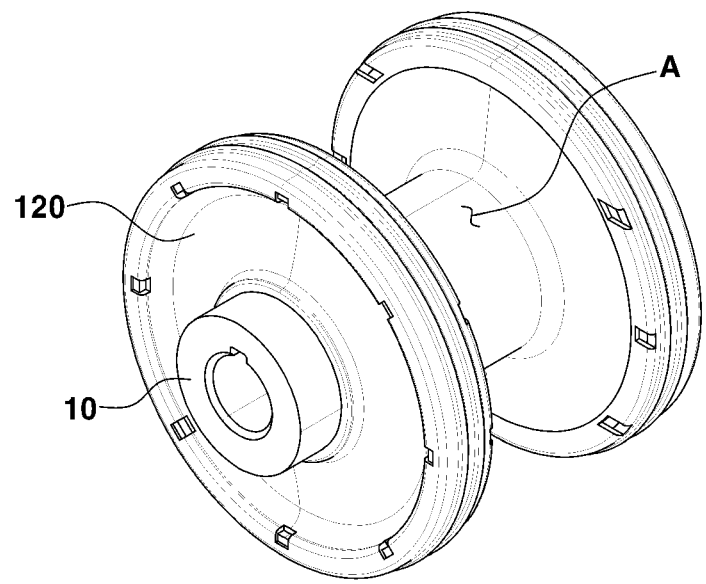

FIG. 1 is a view illustrating a disassembled state of a fluid mount device for a vehicle according to an embodiment of the present disclosure, FIG. 2 is a view illustrating an assembled state of a fluid mount device for a vehicle according to an embodiment of the present disclosure, and FIGS. 3A and 3B are views illustrating a main bush for a fluid mount device for a vehicle according to an embodiment of the present disclosure.

Figure 4A:
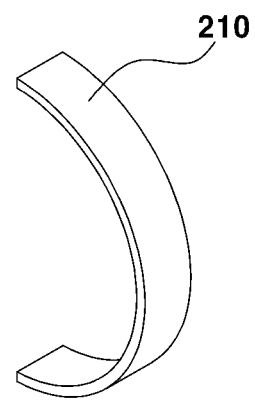
FIGS. 4A to 4C are views illustrating a middle bush for a fluid mount device for a vehicle according to an embodiment of the present disclosure.
Figure 4B:
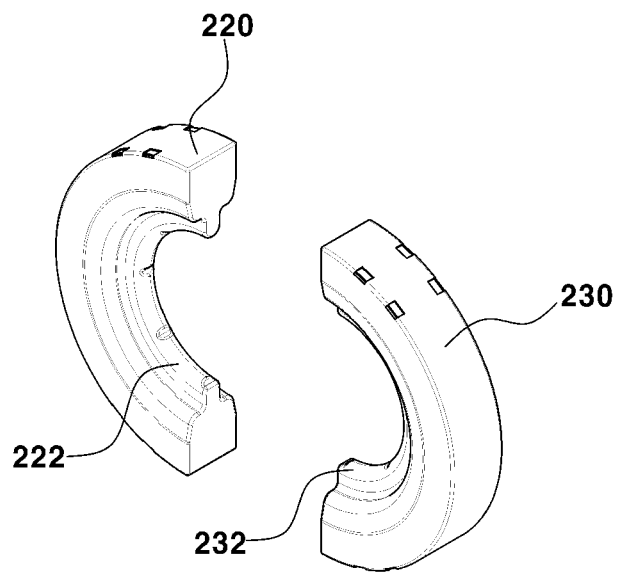
Figure 4C:
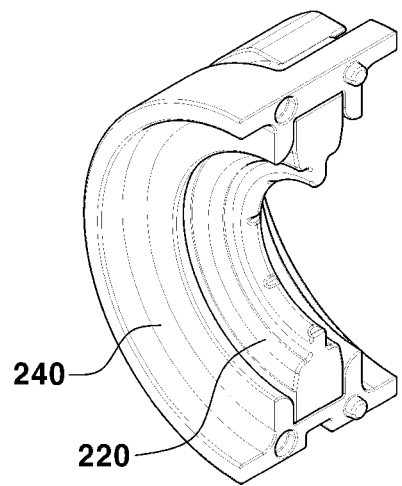
Figure 5A:
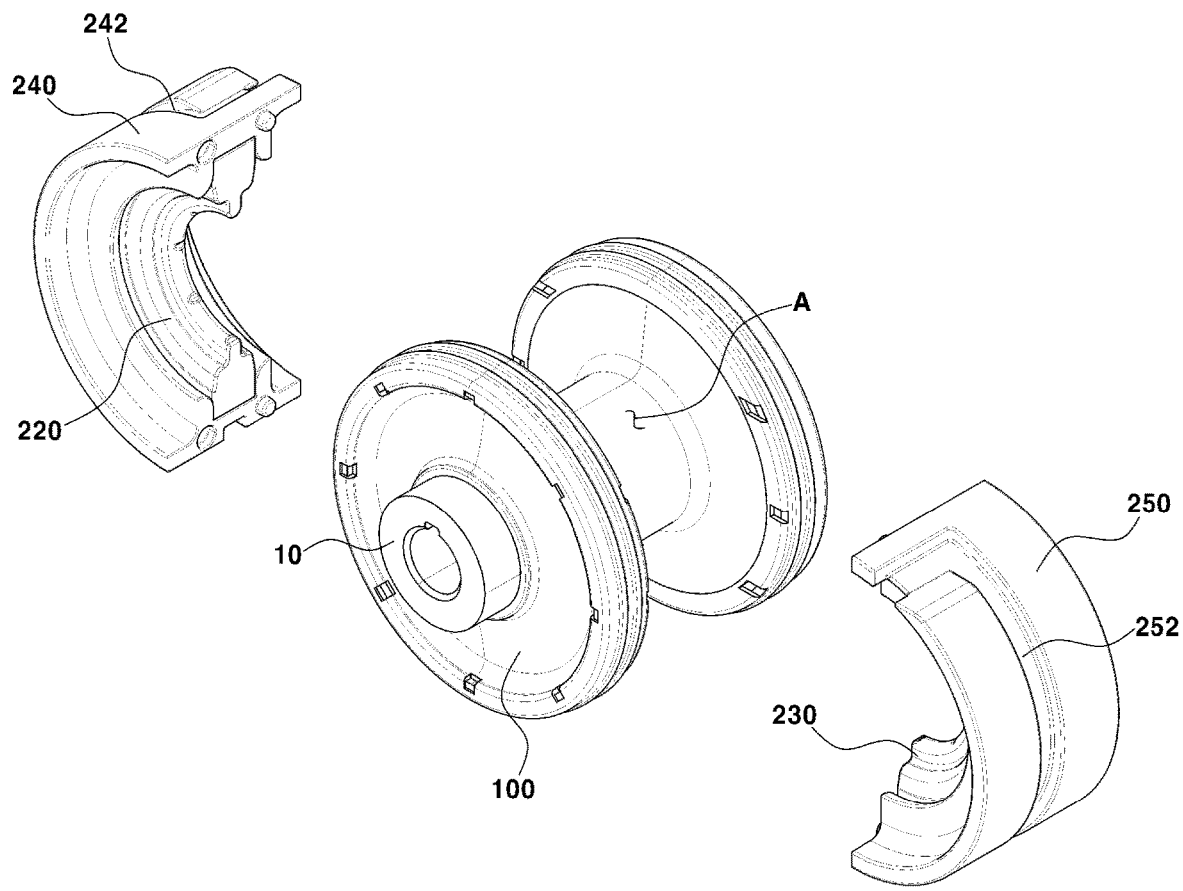
FIGS. 5A to 5C are views illustrating a coupling of a main bush and a middle bush for a fluid mount device for a vehicle according to an embodiment of the present disclosure.
Figure 5B:
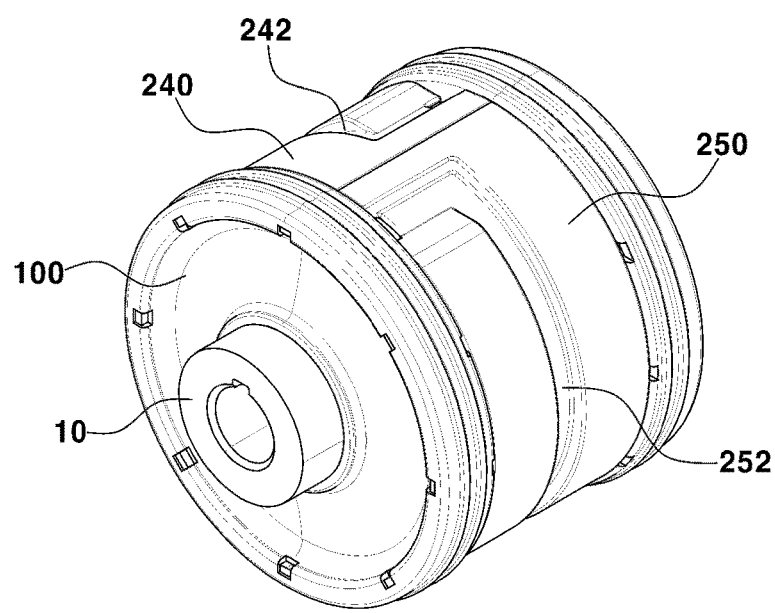
Figure 5C:
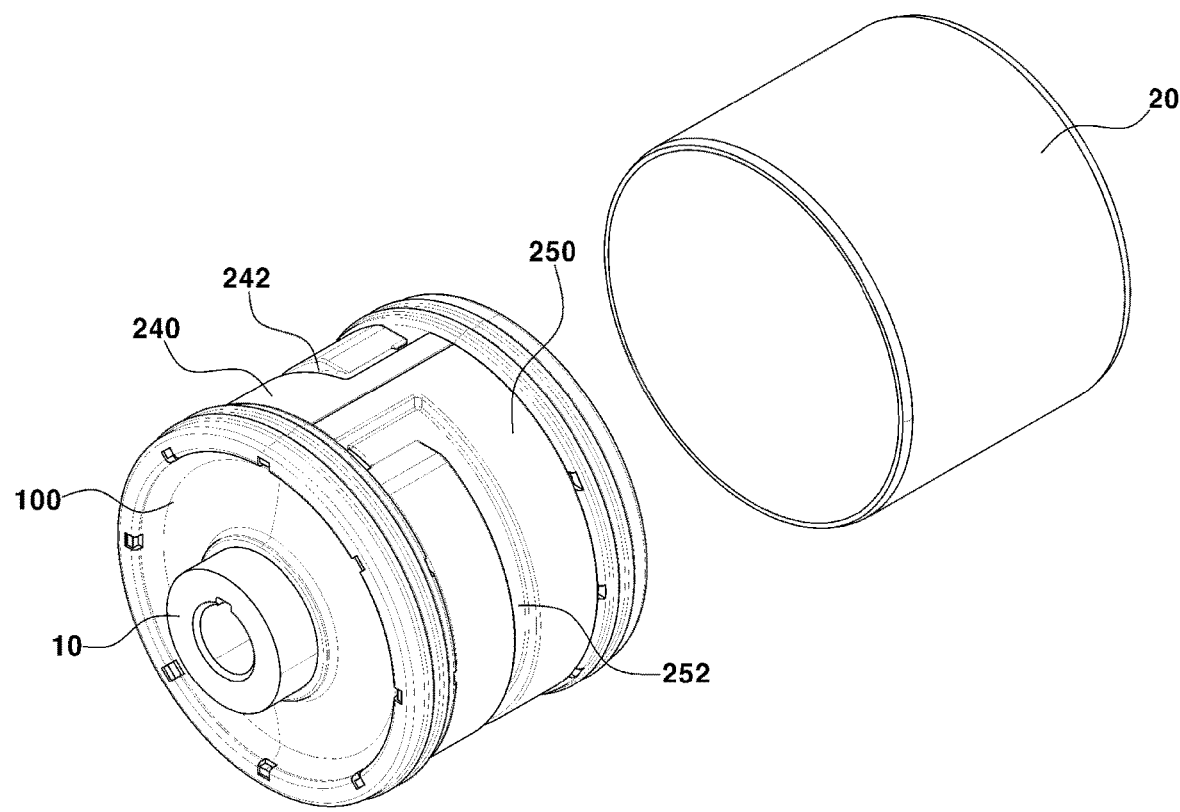
Figure 6:
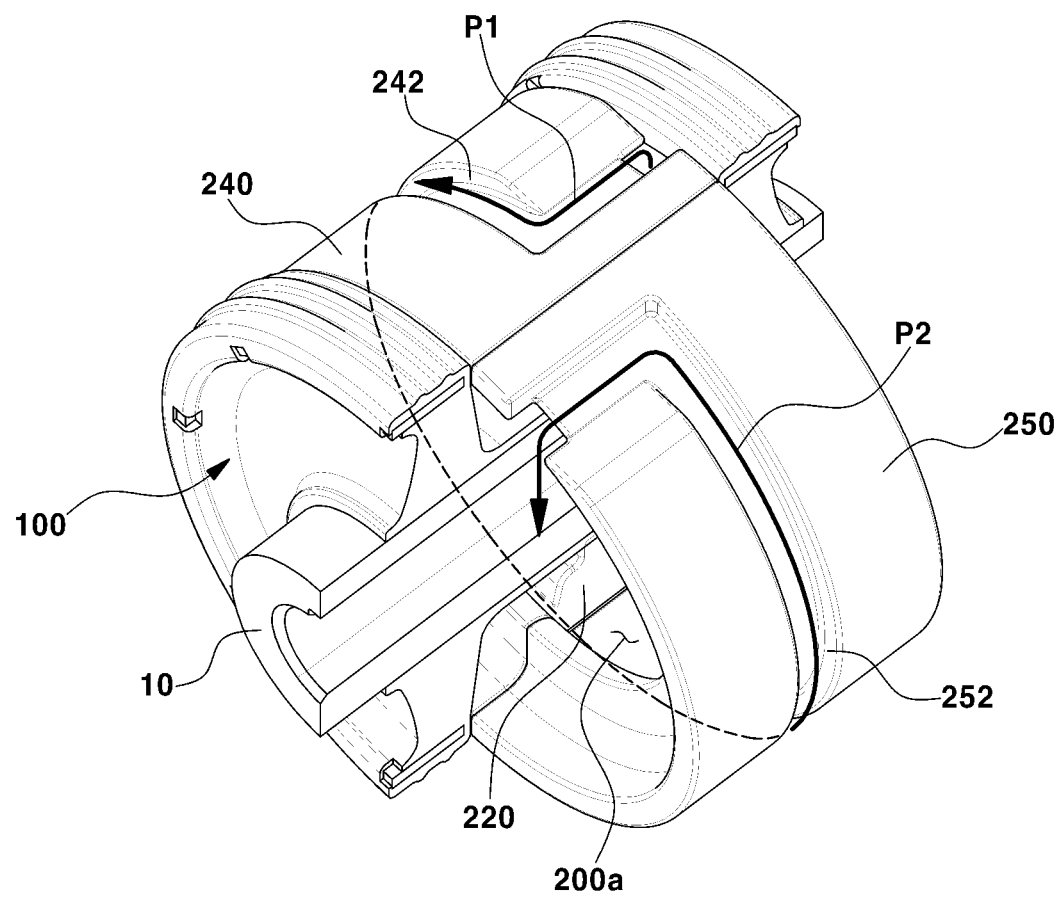
FIG. 6 is a view illustrating a flow path of a fluid with respect to the fluid mount device for a vehicle according to an embodiment of the present disclosure.

Further, FIGS. 4A to 4C are views illustrating a middle bush for a fluid mount device for a vehicle according to an embodiment of the present disclosure, FIGS. 5A to 5C are views illustrating a coupling of a main bush and a middle bush for a fluid mount device for a vehicle according to an embodiment of the present disclosure, and FIG. 6 is a view illustrating a flow path of a fluid with respect to the fluid mount device for a vehicle according to an embodiment of the present disclosure.

Figure 7:
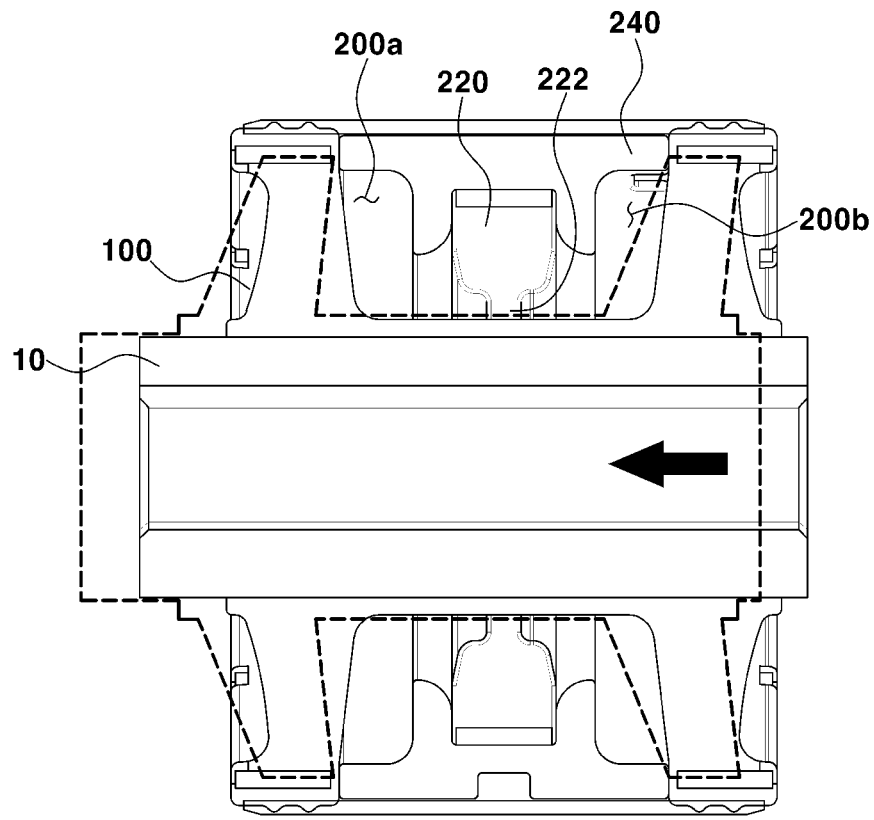
FIG. 7 is a view illustrating a first embodiment in which a front liquid chamber and a rear liquid chamber in the fluid mount device change in volume according to an embodiment of the present disclosure.
Figure 8:
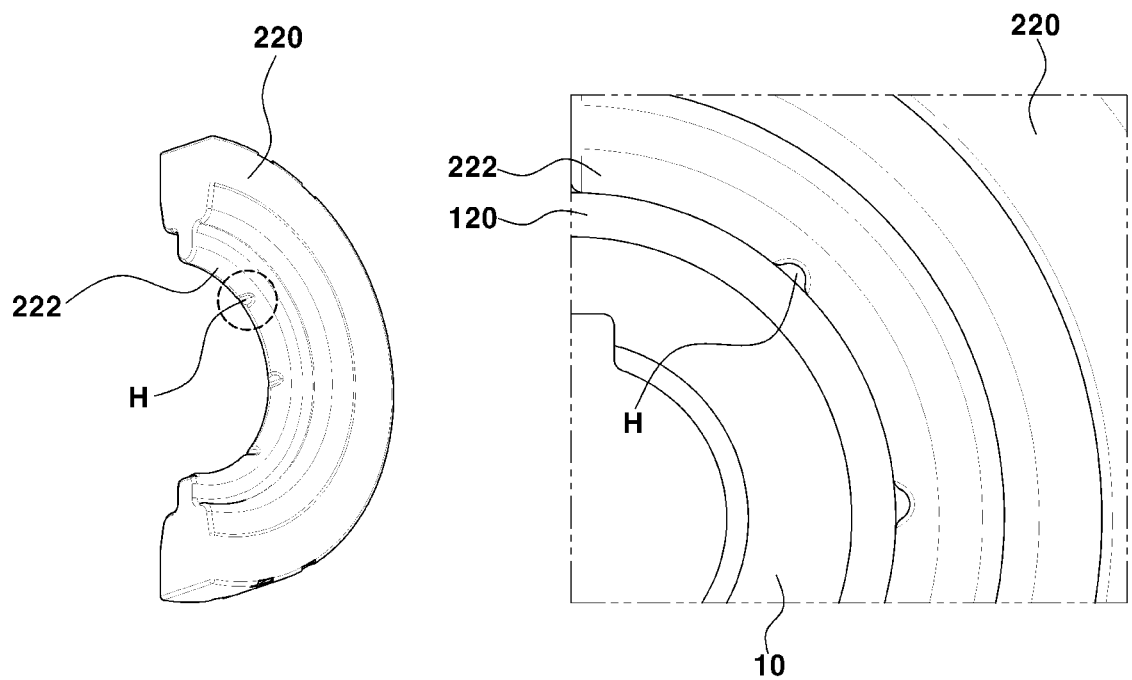
FIG. 8 is a view illustrating a rib and micro holes in a fluid mount device for a vehicle according to an embodiment of the present disclosure.
Figure 9:
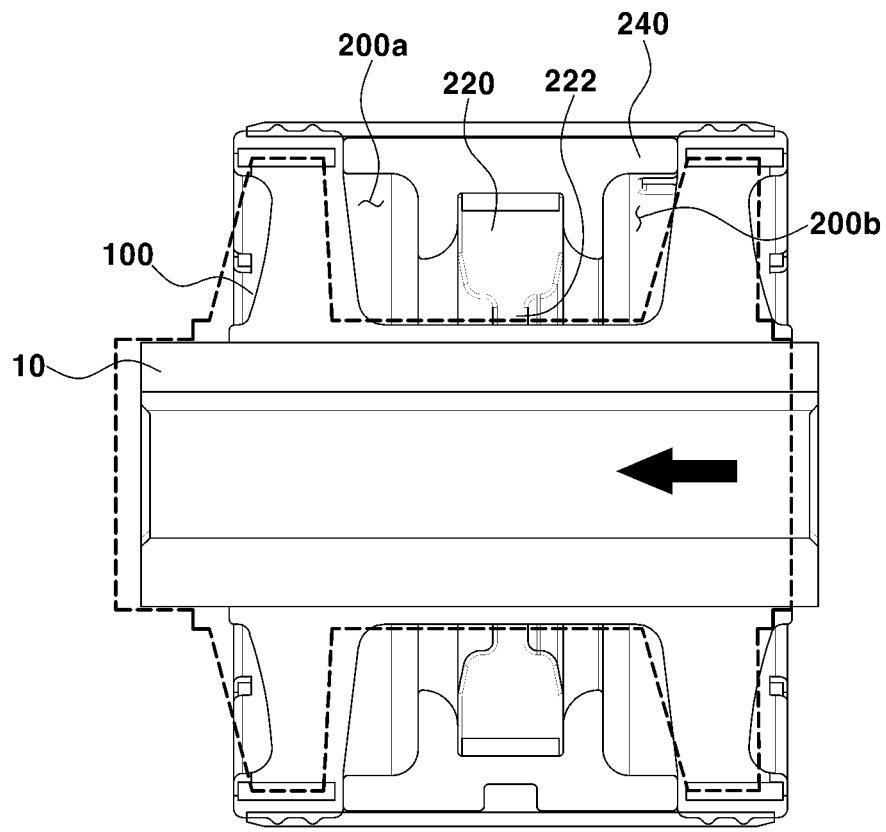
FIG. 9 is a view illustrating a second embodiment in which a front liquid chamber and a rear liquid chamber in the fluid mount device change in volume according to an embodiment of the present disclosure.

Further, FIG. 7 is a view illustrating a first embodiment in which a front liquid chamber and a rear liquid chamber in the fluid mount device change in volume according to an embodiment of the present disclosure, FIG. 8 is a view illustrating a rib and micro holes in a fluid mount device for a vehicle according to an embodiment of the present disclosure, and FIG. 9 is a view illustrating a second embodiment in which a front liquid chamber and a rear liquid chamber in the fluid mount device change in volume according to an embodiment of the present disclosure.

In general, in order insulate vibration of heavy parts, such as an engine, a differential gearbox, a subframe, and the like while supporting the load thereof, a vehicle body is equipped with a mount made of a material such as rubber, specifically, a bush-type mount. Such a bush-type mount has a low axial characteristic relative to horizontal and vertical characteristics.

Figure 10:
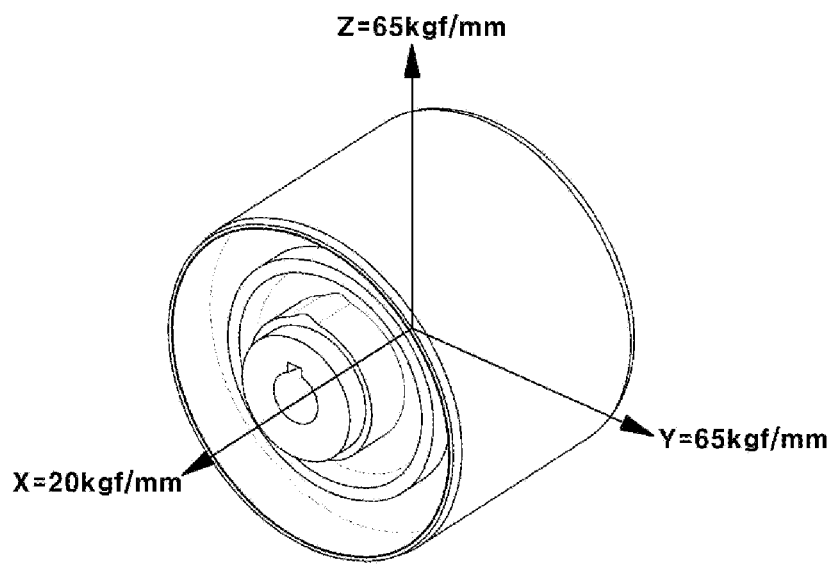
FIG. 10 is a view illustrating three-way characteristics of a conventional bush-type fluid mount device for a vehicle.

That is, as illustrated in FIG. 10, since the x-axis characteristic is relatively low compared to the y-axis and the z-axis characteristics, more specifically, when the mount is disposed along the front-rear direction of a vehicle, the characteristic in the corresponding front-rear direction is low. Problems such as excessive vibrated shaking action may occur, and accordingly, a problem in that mass production is impossible due to insufficient damping force may also occur.

As illustrated in FIGS. 1 and 2, the fluid mount device for a vehicle according to the present embodiment includes a main bush 100 and a middle bush 200 in order to improve the damping performance acting in the axial direction of an inner pipe 10.

The main bush 100 is mounted on the outer circumferential surface of the inner pipe 10, and to which an outer pipe 20 is coupled in a state in which a fluid is fed, thereby sealing an internal region A.

The main bush 100 includes a main bridge ring 110 and a main bridge ring cover 120.

The main bridge ring 110 is provided for forming a skeleton of the main bush 100, and as illustrated in FIG. 3A, a pair of main bridge rings 110 having the same shape is disposed with a predetermined interval around the inner pipe 10.

In addition, as illustrated in FIG. 3B, the main bridge ring covers 120 are mounted to surround the outer circumferential surface of the inner pipe 10 in a state of covering the main bridge rings 110 on opposite sides, so that the internal region A having a predetermined area is defined between the opposite sides facing each other, specifically opposite sides covering the main bridge rings 110.

Here, the main bridge ring cover 120 is preferably formed of an elastic material so that one side and the other side thereof are deformed as the inner pipe 10 moves in the vibration-generating direction.

In other words, since the main bridge ring cover 120 is mounted to surround the outer circumferential surface of the inner pipe 10, if vibration occurs on the front side in the axial direction, the vibration is transmitted to the inner pipe 10 and propagates to the front side. Then, due to its material characteristics, one side and the other side covering the main bridge rings 110 are deformed to be pushed toward the front side, and eventually the internal region A may be deformed.

Meanwhile, the middle bush 200 is fixedly mounted on the internal region A of the main bush 100 to divide the internal region A into a front liquid chamber 200a and a rear liquid chamber 200b.

The middle bush 200 forms a flow path via which, when vibration is generated along the axial direction of the inner pipe 10, a fluid selectively flows along the vibration-generating direction from the front liquid chamber 200a to the rear liquid chamber 200b or from the rear liquid chamber 200b to the front liquid chamber 200a in the internal region A.

To this end, the middle bush 200 includes a middle bridge ring 210, first and second middle bridge ring covers 220 and 230, a first middle plate 240, and a second middle plate 250.

As illustrated in FIG. 4A, the middle bridge ring 210 has a semicircular shape, is provided in a pair so that two middle bridge rings are disposed to face each other in the internal region A.

In addition, as illustrated in FIGS. 4B, the first and second middle bridge ring covers 220 and 230 are fixedly mounted to surround the outer circumferential surface of the main bush 100 in the internal region A in a state of covering the middle bridge rings 210, respectively.

The first and second middle bridge ring covers 220 and 230 have ribs 222 and 232 protruding from the inner surfaces, respectively, which are fixedly pressed against the outer circumferential surface of the main bush 100 so that a seal can be formed between the outer circumferential surface of the main bush 100 and the first and second middle bridge ring covers 220 and 230 in the internal region A.

As illustrated in FIG. 4C, the first middle plate 240 is coupled to surround the outer circumferential surface of the first middle bridge ring cover 220.

In addition, the second middle plate 250 is formed to have the same shape as the first middle plate 240, and as illustrated in FIG. 5A, the second middle plate is coupled in a direction to face the first middle plate 250 in a state of being coupled to surround the outer circumferential surface of the second middle bridge ring cover 230 as in the first middle plate 240.

In this structure, the internal region A is divided into the front liquid chamber 200a and the rear liquid chamber 200b by the first and second middle bridge ring covers 220 and 230. Then, as illustrated in FIG. 5B, upon the first middle plate 240 and the second middle plate 250 being coupled, the sealing can be obtained with respect to the internal region A by finally coupling the outer pipe 20 around the outer circumferential surfaces of the first and second middle plates 240 and 250 in a state in which a fluid is contained, as illustrated in FIG. 5C.

In addition, as illustrated in FIG. 6, the first middle plate 240 and the second middle plate 250 include fluid guides 242 and 252, respectively, for forming predetermined flow paths P1 and P2 on the outer circumferential surfaces thereof, so as to allow a fluid to selectively flow (refer to the arrow direction in FIG. 6) along the flow paths P1 and P2 from the front liquid chamber 200a to the rear liquid chamber 200b, or from the rear liquid chamber 200b to the front liquid chamber 200a depending on the vibration-generating direction.

Meanwhile, an operation of the fluid mount device for a vehicle according to the present embodiment will be described with reference to the configuration of the main bush 100 and the middle bush 200 as described above.

Large Displacement Movement

For example, if the inner pipe 10 moves (vibrates) forward approximately 1.0 mm along the axial direction (refer to the arrow direction in FIG. 7) when a vehicle accelerates rapidly or passes through an uneven road, the main bush 100 also moves in the same direction along the vibration-generating direction of the inner pipe 10. When the main bush 100 moves forward as described above, the first middle bridge ring cover 220 and the second middle bridge ring cover 230 are mounted in a state in which their positions are fixed in the internal region A. In other words, only the protruding ribs 222 and 232 move along the movement direction of the main bush 100, but the first middle bridge ring cover 220 and the second middle bridge ring cover 230 are maintained in a fixed state. Therefore, as illustrated in FIG. 7, the internal space of the front liquid chamber 200a increases relative to the internal space of the rear liquid chamber 200b.

Accordingly, due to the pressure in the rear liquid chamber 200b generated as the internal space is reduced, the fluid in the rear liquid chamber 200b flows along the fluid guides 242 and 252 to the front liquid chamber 200a having an increased internal space through the flow paths P1 and P2 (refer to the arrow direction in FIG. 6), and a predetermined damping value is obtained while the fluid flows from the rear liquid chamber 200b to the front liquid chamber 200a.

Therefore, by using a characteristic of the damping value acting in the axial direction, an x-axis characteristic, which has a relatively low characteristic compared to a y-axis and z-axis characteristics, can be secured at the same level as those of the y-axis and the z-axis (FIG. 10), with the result that it is possible to effectively improve vibrated shaking action according to the axial behavior resulting from the longitudinal movement of the fluid mount device.

Small Displacement Movement

First, the first middle bridge ring cover 220 and the second middle bridge ring cover 230 are provided with ribs 222 and 232. These ribs 222 and 232 are provided with a plurality of micro holes H, which is formed to allow a portion of the fluid contained in the rear liquid chamber 200b to selectively flow to the front liquid chamber 200a as illustrated in FIG. 8 in a state of being fixedly pressed against the outer circumferential surface of the main bush 100.

That is, the micro holes H may be formed at predetermined intervals along the inner circumferential surfaces of the respective ribs 222 and 232 so as to form fluid flow paths in a state in which the first middle bridge ring cover 220 and the second middle bridge ring cover 230 are disposed in contact with the outer circumferential surface of the main bush 100 in the internal region A.

For example, when micro-vibration occurs and the inner pipe 10 moves (vibrates) forward approximately 0.01 to 0.1 mm along the axial direction (refer to the arrow direction in FIG. 9), the main bush 100 also moves in the same direction as the inner pipe 10 along the vibration-generating direction of the inner pipe 10.

As described above, when the main bush 100 moves forward, the first middle bridge ring cover 220 and the second middle bridge ring cover 230 are mounted in a state of being fixed in the internal region A in their positions, so that as illustrated in FIG. 9, the internal space of the front liquid chamber 200a is slightly increased compared to the internal space of the rear liquid chamber 200b.

Therefore, due to the pressure in the rear liquid chamber 200b generated by a slight reduction in the internal space, a predetermined amount of fluid in the rear liquid chamber 200b is bypassed through the micro holes H and flows to and is contained by the front liquid chamber 200a, which can play a role of damping. Consequently, the fluid is selectively bypassed through the plurality of micro holes H from the rear liquid chamber 200b to the front liquid chamber 200a, thereby improving the dynamic characteristics of e.g., a radio frequency corresponding to the small displacement.

As a result, in the present embodiment, according to the large displacement movement or the small displacement movement, the fluid selectively flows through the fluid paths P1 and P2 or the micro holes H, so that different amounts of fluid flow in response to the displacement movement to improve the damping characteristics in the axial direction. This improves not only the conventional problem of excessive vibrated shaking action occurring due to low damping characteristics in a fluid mount device that transmits a damping force in the front-rear direction from the front side of a vehicle, but also the dynamic characteristics of a radio frequency with fluid flow through the micro holes H.

The fluid mount device for a vehicle according to the present disclosure has the fluid-contained bush-type mount structure, in which the middle bridge is disposed between the inner pipe and the outer pipe to partition the interior into the front liquid chamber and the rear liquid chamber such that the middle bridge is fixed separately from front and rear main bridges so that during forward moving along an axial direction, the front liquid chamber increases and the rear liquid chamber decreases in volume so that the internal fluid contained in the rear liquid chamber forcedly flows and is pumped toward the front liquid chamber, thereby securing damping characteristics in the axial direction.

Accordingly, the bush-type mount structure has the effect of reducing the vibrated shaking action according to the axial behavior of the mount device generated by sudden acceleration, uneven roads, and the like.

Further, according to the present invention, when moving forward in the axial direction corresponding to a relatively small displacement, the fluid is bypassed through a plurality of micro-channels formed on the inner circumferential surface of the middle bridge facing the inner pipe to flow from the rear liquid chamber to the front liquid chamber, thereby having the effect of being able to improve the dynamic characteristic of a radio frequency.

Although the present disclosure has been described with reference to the embodiment(s) illustrated in the drawings, this is merely exemplary, and it should be understood that various modifications can be made by those of ordinary skill in the art to which the present disclosure pertains, and all or parts of the above-described embodiment(s) can be selectively combined and configured. Accordingly, authentic technical protection range of the present disclosure should be determined by the technical idea of the appended claims.

What is claimed is:

1. A fluid mount for a vehicle, comprising:
a main bush mounted on an outer circumferential surface of an inner pipe and to which an outer pipe is coupled so that an internal region of the main bush containing a fluid is sealed; and
a middle bush dividing the internal region into a front liquid chamber and a rear liquid chamber and configured to, with vibration being generated along an axial direction of the inner pipe, form a fluid path along a vibration-generating direction to allow the fluid to selectively flow from the front liquid chamber to the rear liquid chamber or from the rear liquid chamber to the front liquid chamber in the internal region,
wherein the middle bush includes:
a pair of middle bridge rings each having a semicircular shape and disposed to face each other in the internal region;
first and second middle bridge ring covers fixedly mounted to surround an outer circumferential surface of the main bush to accommodate the middle bridge rings;
a first middle plate having a hemispherical shape and coupled to the first middle bridge ring cover; and
a second middle plate having a hemispherical shape coupled to the second middle bridge ring cover and mounted to face the first middle plate to divide the internal region into the front liquid chamber and the rear liquid chamber.

2. The fluid mount according to claim 1, wherein the main bush includes:
 a pair of main bridge rings disposed around the outer circumferential surface of the inner pipe; and
 a pair of main bridge ring covers, covering the pair of main bridge rings, each mounted at either end of the inner pipe to surround the outer circumference of the inner pipe, the internal region disposed between the pair of main bridge ring covers.

3. The fluid mount according to claim 2, wherein each main bridge ring cover includes an elastic material so that one side and the other side of the main bridge ring cover are deformed as each main bridge ring cover moves in the vibration-generating direction.

4. The fluid mount according to claim 1, wherein the first middle plate and the second middle plate respectively include fluid guides forming fluid paths, wherein the fluid guides are connected together to allow the fluid in the rear liquid chamber to selectively flow to the front liquid chamber via the first and second middle plates as the vibration is generated toward a front side of the inner pipe.

5. The fluid mount according to claim 4, wherein as the fluid contained in the rear liquid chamber flows into the front liquid chamber through the fluid guides, an internal space of the front liquid chamber relatively increases compared to that of the rear liquid chamber.

6. The fluid mount according to claim 4, wherein the first and second middle bridge ring covers respectively have ribs protruding toward the outer circumferential surface of the main bush, and the ribs are fixedly pressed against the outer circumferential surface of the main bush and provided with a plurality of micro holes to allow a portion of the fluid in the rear liquid chamber to selectively flow to the front liquid chamber.

\* \* \* \* \*